(12) United States Patent
Huesmann

(10) Patent No.: US 6,403,213 B1
(45) Date of Patent: Jun. 11, 2002

(54) HIGHLY FILLED UNDERCOAT FOR NON-STICK FINISH

(75) Inventor: Peter L. Huesmann, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/566,337

(22) Filed: May 8, 2000

Related U.S. Application Data

(60) Provisional application No. 60/134,358, filed on May 14, 1999.

(51) Int. Cl.$^7$ ................................................. B32B 18/00
(52) U.S. Cl. ........................ 428/325; 428/421; 428/422; 428/458; 428/461; 428/473.5; 428/474.4
(58) Field of Search ................................. 524/401, 405, 524/430, 437, 463, 514; 428/421, 422, 325, 473.5, 474.4, 458, 461

(56) References Cited

U.S. PATENT DOCUMENTS

| 4,014,834 A | | 3/1977 | Concannon | 260/29.2 N |
| 5,250,356 A | | 10/1993 | Batzar | 428/421 |
| 5,312,576 A | * | 5/1994 | Swei et al. | 264/212 |
| 5,552,210 A | * | 9/1996 | Horn, III et al. | 428/209 |
| 5,562,991 A | | 10/1996 | Tannenbaum | 428/421 |

* cited by examiner

*Primary Examiner*—Blaine Copenheaver
*Assistant Examiner*—Christopher Paulraj

(57) ABSTRACT

The invention relates to a composition applicable as a undercoat for a non-stick coating on a substrate, comprising (a) inorganic filler of ceramic particles, the particles having an average particle size of 1 micrometer or less and an aspect ratio of not greater than 2.5, (b) adhesion promoter wherein the weight proportion of inorganic filler to adhesion promoter is in the range of 5:1 to 1.7:1, and (c) from 0 to 25 wt. % of a fluoropolymer based on the weight of the composition of the undercoat layer after baking.

14 Claims, No Drawings

HIGHLY FILLED UNDERCOAT FOR NON-STICK FINISH

RELATED APPLICATION

This application claims the benefit of Provisional Application No. 60/134,358, filed May 14, 1999.

FIELD OF THE INVENTION

This invention relates to primers and base coats for use with non-stick fluoropolymer coatings.

BACKGROUND OF THE INVENTION

Fluoropolymer resins, and especially perfluoropolymer resins, are known for their low surface energy and non-stick properties as well as thermal and chemical resistance. It has long been desirable to achieve durable non-stick polymer coatings on a variety of substrates. As discussed in U.S. Pat. No. 5,562,991 to Tannenbaum, a primer was developed for use on a variety of substrates, including smooth substrates, which has adequate adhesion both to the substrate and to a fluoropolymer overcoat. Tannenbaum achieved this objective by applying a primer comprising fluoropolymer and polymer binder in the weight proportion of 0.5 to 2.0:1 and in addition, from 5 to 30 weight % of an inorganic film hardener. There still remains a need for fluoropolymer coatings that have improved adhesion to substrates as well as improved scratch, abrasion, and wear resistance.

However in order to achieve a better level of adherence, it would be desirable to develop a coating system which exhibits reduced shrinkage during the drying and curing processes normally associated with the application of fluoropolymer systems. More specifically, such processes which require the application of heat to remove volatile components of the coating system as well as to melt flow and cure organic polymeric components, create dimensional changes in the coating and adversely affect adherence to substrate materials.

A particular concern in the cookware industry is decorative cookware where ceramic coating covers at least a portion of the interior of the cookware. This can occur when a ceramic "frit" is intentionally applied to the interior of the cookware to harden the surface. This can also occur when a ceramic coating is applied to the exterior of a metal preform that is geometrically complex and the masking of the interior is difficult and expensive. In these cases, ceramic over-spray can partially coat the interior of the preform and interfere with the adhesion of a non-stick coating which is subsequently applied.

SUMMARY OF THE INVENTION

The present invention provides a composition which is applicable as a undercoat for a non-stick coating on a substrate, comprising (a) inorganic filler of ceramic particles, the particles having an average particle size of 1 micrometer or less and an aspect ratio of not greater than 2.5, (b) adhesion promoter wherein the weight proportion of inorganic filler to adhesion promoter is in the range of 5:1 to 1.7:1 and (c) from 0 to 25 wt. % of a fluoropolymer based on the weight of the composition of the undercoat layer after baking.

In another embodiment the present invention includes a coated substrate having a non-stick coating, wherein the coating comprises an undercoat and a fluoropolymer overcoat, the undercoat containing (a) inorganic filler of ceramic particles, the particles having a particle size of 1 micrometer or less and an aspect ratio of not greater than 2.5, (b) at least one adhesion promoter wherein the weight proportion of inorganic filler to adhesion promoter is in the range of 5:1 to 1.7:1 and (c) from 0 to 25 wt. % of a fluoropolymer based on the weight of the composition of the undercoat layer after baking.

DETAILED DESCRIPTION

The present invention, in certain of its embodiments, provides a coating system comprising a substrate with a multilayer non-stick coating of a primer, and a top coat with one or more intermediate layers and optionally a base coat applied directly to the substrate beneath the primer. The base coat and primer are referred to as undercoats. The intermediate coating(s) and topcoat are referred to as overcoats.

Inorganic Filler

The major component of the undercoat composition of the present invention is an inorganic filler of ceramic particles. The inorganic filler together with a minor amount of adhesion promoter surprisingly produces a smooth, continuous film with superior adhesion to a variety of substrates as well as to fluoropolymer applied as an overcoat to the undercoat. By "undercoat" it is meant either the base coat applied directly to a substrate or a primer applied either to the base coat or to the substrate. By "overcoat" it is meant one or more intermediate coatings or a topcoat which are applied over the primer layer. The high level of inorganic filler present reduces the level of shrinkage that occurs during normal drying and coating operations. By reducing the levels of stress in a coating, adhesion of the coating to a substrate is increased. This reduction results because the levels of stress that contribute to shrinkage are in direct opposition to the force needed to secure the coating layer to the substrate. By increasing the amount of inorganic filler that contributes no or very little shrinkage, the coating comprised of inorganic and organic components undergoes decreased dimensional change upon heat application. The inorganic filler is composed of ceramic particles, the particles having an average particle size of 1 micrometer or less and the weight proportion of inorganic filler to adhesion promoter is in the range of 5:1 to 1.7:1. Thus the inorganic filler is usually present as 45–85 wt. %, preferably 60–85 wt. %, and more preferably 48–72 wt. % of the undercoat composition based on the baked weight, depending on the amount of optional fluoropolymer component. It is to be recognized that the levels of inorganic filler in the present invention are considerably higher than conventionally known compositions such as those disclosed in the prior art represented by U.S. Pat. No. 5,562,991 to Tannenbaum, and U.S. Pat. No. 5,250,356 to Batzar. Additionally, the high level of inorganic filler contributes to increased scratch, wear and abrasion resistance.

The inorganic filler component is one or more filler type materials that are inert with respect to the other components of the composition and thermally stable at its eventual baking temperature that fuses the undercoat composition and/or subsequent fluoropolymer overcoats. The inorganic filler is water insoluble so that it is typically uniformly dispersible but not dissolved in the aqueous dispersion form of the composition of the invention. Typically, the inorganic filler of this invention preferably comprises ceramic particles having an average particle size of 1 micrometer or less and preferably an average particle size in the range of 0.1 micrometer to 1.0 micrometer It is also preferred that the ceramic particles have an aspect ratio of not greater than 2.5 and preferably not greater than 1.5. By aspect ratio is meant a ratio of the longest diameter of the particle to the greatest distance of a dimension measured perpendicular to the longest diameter (major axis) of the particle. The aspect ratio is a means of quantifying a preferred particle shape. Particles with a high aspect ratio are whisker-like or rod shaped unlike the preferred particles of this invention, which are preferably more spherical and more closely approach an ideal aspect ratio of 1. Also the particle size distribution is preferably narrow with a monodisperse distribution being most preferred. The particle shape and size distribution are important in order to maximize the packing density of the resulting coating.

The inorganic filler is preferably selected from a group of inorganic nitrides, carbides, borides and oxides. Examples of ceramic particles that may be especially useful include particles of inorganic oxides such as silicon oxide, aluminum oxide, zinc oxide, and tin oxide, and inorganic carbides such as silicon carbide.

Adhesion Promoter

The adhesion promoter component of the undercoat composition is preferably composed of organic polymer that is film-forming upon heating to fusion and is also thermally stable. This component is well known in undercoat applications for non-stick finishes, for adhering a fluoropolymer-containing undercoat layer to substrates and for film-forming within and as part of a undercoat layer. The fluoropolymer by itself has little to no adhesion to a smooth substrate. The adhesion promoter is generally non-fluorine containing and yet adheres to the fluoropolymer. In this invention, the adhesion promoter is used as minor component in conjunction with a major amount of inorganic filler. Fluoropolymer as discussed below can also be used as an additional minor component. Preferred adhesion promoters are those that are soluble or dispersible in water or a mixture of water and organic solvent for the adhesion promoter, which solvent is miscible with water. This solubility aids in the blending of the adhesion promoter with the fluoropolymer component (when present) in the aqueous dispersion form.

An example of the adhesion promoter component is polyamic acid salt which converts to polyamideimide (PAI) upon baking of the composition to form the undercoat layer. This adhesion promoter is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrrolidone, and a viscosity-reducing agent, such a firfuryl alcohol and reacted with tertiary amine, preferably triethylamine, to form the salt, which is soluble in water, as described in greater detail in U.S. Pat. 4,014,834 (Concannon). The resultant reaction medium containing the polyamic acid salt can then be blended with a fluoropolymer aqueous dispersion, and because the coalescing agent and viscosity-reducing agent are miscible in water, the blending produces a uniform coating composition. The blending can be achieved by simple mixing of the liquids together without using excess agitation so as to avoid coagulation of the fluoropolymer aqueous dispersion, if present. Other adhesion promoters that can be used include polyether sulfone (PES) and polyphenylene sulfide (PPS).

When the undercoat composition is applied as a liquid medium, wherein the liquid is water and/or organic solvent, the adhesion properties described above will manifest themselves upon drying and baking of the undercoat layer together with baking of the next-applied layer of fluoropolymer to form the non-stick coating of the substrate.

For simplicity, only one adhesion promoter may be used to form the adhesion promoter component of the composition of the present invention. However, multiple adhesion promoters are also contemplated for use in this invention, especially when certain end-use properties are desired, such as flexibility, hardness, or corrosion protection. Common combinations include PAI/PES, PAI/PPS and PES/PPS.

The weight proportion of inorganic filler to adhesion promoter, is preferably in the weight ratio of 5:1 to 1.7:1. The weight ratios of inorganic filler to adhesion promoter disclosed herein are based on the weight of these components in the applied layer formed by baking the composition after application to its substrate. The baking drives off the volatile materials present in the coating composition, including the salt moiety of the polyamic acid salt as the imide bonds are formed during baking. For convenience, the weight of adhesion promoter, when it is polyamic acid salt which is converted to polyamideimide by the baking step, can be taken as the weight of polyamic acid in the starting composition.

Fluoropolymer

In addition to the inorganic filler and the adhesion promoter, the undercoat composition of this invention may contain from 0 to 25 wt. %, preferably from 1 to 15 wt. %, of a fluoropolymer based on the baked weight of the composition, and more preferably from 4 to 8 wt. % of a fluoropolymer. The fluoropolymer component of the composition this invention can be non melt-fabricable fluoropolymer with a melt viscosity of at least $1 \times 10^7$ Pa·s. One embodiment is polytetrafluoroethylene (PTFE) having a melt viscosity of at least $1 \times 10^8$ Pa·s at 380° C. with the highest heat stability among the fluoropolymers. Such PTFE can also contain a small amount of comonomer modifier which improves film-forming capability during baking (fusing), such as perfluoroolefin, notably hexafluoropropylene (HFP) or perfluoro(alkyl vinyl) ether, notably wherein the alkyl group contains 1 to 5 carbon atoms, with perfluoro (propyl vinyl ether) (PPVE) being preferred. The amount of such modifier will be insufficient to confer melt-fabricability to the PTFE, generally being no more than 0.5 mole %. The PTFE, also for simplicity, can have a single melt viscosity, usually at least $1 \times 10^9$ Pa·s, but a mixture of PTFEs having different melt viscosities can be used to form the fluoropolymer component.

The fluoropolymer component can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3–6 carbon atoms and perfluoro(alkyl vinyl ethers) (PAVE) wherein the alkyl group contains 1–5 carbon atoms, especially 1–3 carbon atoms. Especially preferred comonomers include hexafluoropropylene (HFP), perfluoro(ethyl vinyl ether) (PEVE), perfluoro (propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it be sufficient to be film-forming and be able to sustain a molded shape so as to have integrity in the undercoat application. Typically, the melt viscosity will be at least 1×10 Pa·s and may range up to about 60–100×10³ Pa·s as determined at 372° C. according to ASTM D-1238. A preferred composition is a blend of non melt-fabricable fluoropolymer with a melt viscosity in the range from 1×10⁷ to 1×10¹¹ Pa·s and melt fabricable fluoropolymer with a viscosity in the range from 1×10³ to 1×10⁵ Pa·s.

The fluoropolymer component is generally commercially available as a dispersion of the polymer in water, which is the preferred form for the composition of the invention for ease of application and environmental acceptability. By "dispersion" is meant that the fluoropolymers particles are stably dispersed in the aqueous medium, so that settling of the particles does not occur within the time when the dispersion will be used; this is achieved by the small size of the fluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

Useful fluoropolymers also include those commonly known as micropowders. These fluoropolymers generally have a melt viscosity 1×10² Pa·s to 1×10⁶ Pa·s at 372° C. Such polymers include but are not limited to those based on the group of polymers known as tetrafluoroethylene (TFE) polymers. The polymers may be directly polymerized or made by degradation of higher molecular weight PTFE resins. TFE polymers include homopolymers of TFE (PTFE) and copolymers of TFE with such small concentrations of copolymerizable modifying comonomers (<1.0 mole percent) that the resins remain non-melt-processible (modified PTFE). The modifying monomer can be, for example, hexafluoropropylene (HFP), perfluoro(propyl vinyl) ether (PPVE), perfluorobutyl ethylene, chlorotrifluoroethylene, or other monomer that introduces side groups into the molecule.

The invention pertains to coated substrates having an undercoat and a fluropoymer overcoat the undercoat containing (a) inorganic filler of ceramic particles, the particles having a particle size of 1 micrometer or less and an aspect ratio of not greater than 2.5, (b) at least one adhesion promoter wherein the weight proportion of inorganic filler to adhesion promoter is in the range of 5:1 to 1.7:1 and (c) from 0 to 25 wt. % of a fluoropolymer based on the weight of the composition of the undercoat layer after baking. Further the invention pertains to coated substrates wherein the overcoat contains inorganic filler of ceramic particles, the particles having an average particle size of 1 micrometer or less. Further the invention pertains to coated substrates wherein the overcoat contains organic adhesion promoter.

Coating Application

The compositions of the present invention can be applied to substrates by conventional means. Spray and roller applications are the most convenient application methods, depending on the substrate being coated. Other well-known coating methods including dipping and coil coating are suitable.

The substrate can be of any material that can withstand the bake temperature, such as metal and ceramics, examples of which include aluminum, anodized aluminum, cold-rolled steel, stainless steel, enamel, glass, and pyroceram. The substrate can be smooth, i.e. having a surface profile of less than 50 microinches (1.25 micrometers) as measured by a model RT 60 surface tester made by Alpa Co. of Milan, Italy, and needs to be clean. The composition of the present invention is especially useful for adhering non-stick coatings to a metal preform that has a rim of ceramic overspray on its interior.

Products having non-stick finishes made using compositions of the present invention include cookware, bakeware, rice cookers and inserts therefor, water pots, iron sole plates, conveyors, chutes, roll surfaces, cutting blades, etc.

TEST METHODS

Post Boiling Water Fingernail Adhesion (PWA)

Coated test substrates are submerged in boiling water for 15 minutes. The water is allowed to come to a full boil after inserting the coated substrate, before timing is begun. After the boiling water treatment, the substrate is cooled to room temperature and dried thoroughly. The fingernail scratch test involves the use of the fingernail, to chip or peel away the coating from the edge of a deliberate knife scratch in the film, to test the degree of adhesion of the film. Improved adhesion is judged by the distinctively increased difficulty in peeling the film from the panel. In some cases the film cannot be peeled from the panel. Cookware passes this test if no coating is removed, even with extended pulling.

Cross-Hatch Adhesion

Coated test substrates are submerged in boiling water for 15 minutes. The water is allowed to come to a full boil after inserting the coated substrate, before timing is begun. After the boiling water treatment, the substrate is cooled to room temperature and dried thoroughly. Eleven parallel lines are cut in the coated substrate surface using a template and a razor blade. The template is then rotated 90 degrees and eleven more cuts are made, forming 100 squares on the surface. Reinforced adhesive tape is applied across the squares and pressure is firmly applied to secure the tape to the squares. The tape is then quickly pulled from the squares and the number of squares for which coating has been removed (if any) is recorded. The pan is then rotated and reinforced tape is again applied, pressed and pulled, recording the number of squares for which the coating has been removed. Cookware passes this test if either one or no squares come off on the tape, depending on the type of coating.

EXAMPLES

Examples 1 and 2

Examples 1 and 2 are examples of a four layer coating system using two undercoats which are a base coat made according to the present invention and a primer and two overcoats, an intermediate coating and a topcoat. An aluminum oxide dispersion to be used in formulating base coats for Examples 1 and 2 is prepared in accordance with the ingredients listed in Table 1. An aluminum oxide dispersion to be used in formulating a primer coat and an intermediate coating for Examples 1 and 2 is prepared in accordance with the ingredients listed in Tables 2. A base coat for Example 1 as represented in Table 3 and a base coat as represented in Table 4 are respectively sprayed on two separate smooth aluminum 3004 substrates which have been thoroughly cleaned but not grit blasted or subjected to other chemical treatment. The coatings are dried at 150° F. (66° C.). The coatings are then baked at 300° F. (149° C.) for 5 minutes and then 800° F. (427° C.) for 5 minutes. The resulting brown coating is measured to be 0.26 mil (6.6 micrometers) and 0.16 mil (4.1 micrometers) respectively. An initial nail adhesion test is performed and the coating adhesion is found to be very good. The initial nail adhesion test is performed by scratching with a knife but without the boiling water immersion as described in the PWA test above. A scratch is only made after a good degree of difficulty and the coating can not be peeled back after much effort.

Both the substrates with base coats are subsequently sprayed with the primer formulation as listed in Table 6 and dried at 150° F. (66° C.). The substrates are then coated with the intermediate coating formulation as listed in Table 7 followed by the topcoat formulation as listed in Table 8. The primer is applied to a thickness of 0.32 and 0.37 mil (8.1 and 9.4 micrometers) respectively; the intermediate coating is applied to a thickness of 0.62 and 0.77 mil (15.8 and 19.6 micrometers) respectively; and the top coat is applied to a thickness of 0.30 and 0.31 mil (7.6 and 7.9 micrometers) respectively. The coated substrates are baked at 300° F. (149° C.) for 5 minutes and then 800° F. (427° C.) for 5 minutes.

For the base coat compositions of Example 1 and Example 2, the ratio of inorganic filler to adhesion promoter is 4.5:1 and 1.79:1, respectively.

The coated substrates are subjected to initial adhesion, post boiling water adhesion and cross hatch adhesion tests as described above. No removal of the coating is observed.

Comparative Example 1

For comparison to the present invention, an aluminum substrate having a four coating system (base coat, primer, intermediate coating and topcoat) is prepared with the base coat having inorganic filler particles of substantially larger size than the invention. A base coat for Comparative Example 1 as represented in Table 5 is sprayed on a smooth aluminum 3004 substrate which has been thoroughly cleaned but not grit blasted or subjected to other chemical treatment. The base coat uses a dispersion of aluminum oxide particles wherein the particles have an average particles size of 2.7–3.7 micrometers. The base coat is dried at 150° F. (66° C.). The coating is then baked at 300° F. (149° C.) for 5 minutes and then 800° F. (427° C.) for 5 minutes. The resulting coating is measured to be about 0.3 mil (8 micrometers).

The substrate with base coat is subsequently sprayed with the primer formulation as listed in Table 6 and dried at 150° F. (66° C.). The substrate is then coated with the intermediate coating formulation as listed in Table 7 followed by the topcoat formulation as listed in Table 8. The primer is applied to a thickness of about 0.3 mil (8 micrometers); the intermediate coating is applied to a thickness of about 0.7 mil (18 micrometers) respectively; and the top coat is applied to a thickness of about 0.3 mil (8 micrometers). The coated substrate is baked at 300° F. (149° C.) for 5 minutes and then 800° F. (427° C.) for 5 minutes.

For the base coat composition of Comparative Example 1, the ratio of inorganic filler to adhesion promoter is 2.3:1.

The coated substrate is subjected to post boiling water adhesion as described above. Failure was observed by easy removal of the coating at the substrate interface.

TABLE 1

Aluminum oxide dispersion for base coat of Examples 1 and 2

| Ingredient | Weight % |
|---|---|
| deionized water | 59.80 |
| Triton ® X100 surfactant | 0.20 |
| alpha aluminum oxide (AKP-30, made by Sumitomo Chemical Co. D50 reported as 0.39 micrometers with 96% < 1 micrometer; aspect ratio <2.5) | 40.00 |
| Total | 100.00 |

Pre-mixed and dispersed with a Mini Motor Mill, Model 250 manufactured by Eiger Machinery Inc.

TABLE 2

Aluminum oxide dispersion for primer and intermediate coating of Examples 1 and 2, and Comparative Example 1

| Ingredient | Weight % |
|---|---|
| deionized water | 59.80 |
| Triton ® X100 surfactant | 0.20 |
| alpha aluminum oxide (AKP-20, made by Sumitomo Chemical Co. D50 reported as 0.54 micrometers with 95% < 1 micrometer; aspect ratio <2.5) | 40.00 |
| Total | 100.00 |

Pre-mixed and dispersed with a Mini Motor Mill

TABLE 3

Base coat formulation for Example 1

| Ingredient | Weight % |
|---|---|
| Polyamic acid | 4.564 |
| Deionized water | 66.479 |
| Triton ® X100 surfactant | 0.101 |
| Diethyl alcohol amine | 0.637 |
| Triethyl amine | 1.274 |
| Furfuryl Alcohol | 3.516 |
| N-methylpyrrolidone | 2.959 |
| Alpha aluminum oxide AKP-30 (% solids in dispersion, Table 1) | 20.470 |
| Total | 100 |

TABLE 4

Base coat formulation for Example 2

| Ingredient | Weight % |
|---|---|
| Polyamic acid | 5.727 |
| Deionized water | 73.427 |
| Triton ® X100 surfactant | 0.051 |
| Diethyl alcohol amine | 0.799 |
| Triethyl amine | 1.598 |
| Furfuryl Alcohol | 4.411 |
| N-methylpyrrolidone | 3.713 |
| Alpha aluminum oxide AKP-30 (% solids in dispersion, Table 1) | 10.274 |
| Total | 100 |

TABLE 5

Base coat formulation for Comparative Example 1

| Ingredient | Weight % |
|---|---|
| Polyamic acid | 7.204 |
| Deionized water | 62.593 |
| Diethyl alcohol amine | 1.005 |
| Triethyl amine | 2.01 |
| Furfuryl alcohol | 5.554 |
| N-Methylpyrrolidone | 4.671 |
| Sodium Napthalene Sulfate | 0.311 |
| Hydroxypropyl Cellulose | 0.072 |
| Aluminum Oxide 2430-137* | 16.58 |
| Total | 100 |

*(50.0% solids in dispersion; avg ps = 2.7–3.7 microns)

TABLE 6

Primer formulation for Examples 1 and 2 and Comparative Example 1

| Ingredient | Weight % |
|---|---|
| Black pigment | 1.366 |
| Ultramarine blue pigment | 3.074 |
| Ludox ® colloidal silica | 0.309 |
| Zinc Oxide | 0.004 |
| PTFE (solids in aqueous disp) | 4.237 |
| FEP (solids in aqueous disp) | 2.799 |
| Polyamic acid | 4.779 |
| Deionized water | 70.675 |
| Triethanolamine | 0.055 |
| Triton ® X100 surfactant | 0.633 |
| Sodium Polynapthalene Sulfonate | 0.102 |
| Diethyl alcohol amine | 0.667 |
| Triethyl amine | 1.334 |
| Furfuryl Alcohol | 3.684 |
| N-methylpyrrolidone | 3.098 |
| alpha aluminum oxide AKP-20 (% solids in dispersion, Table 2) | 3.184 |
| Total | 100 |

TABLE 7

Intermediate coating formulation for Examples 1 and 2 and Comparative Example 1

| Ingredient | Weight % |
|---|---|
| Black pigment | 1.059 |
| Ultramarine blue pigment | 0.307 |
| Titania coated mica, EM Ind | 0.743 |
| Cerium octoate | 0.497 |
| PTFE (solids in aqueous disp) | 28.736 |
| PFA (solids in aqueous disp) | 5.074 |
| Triton ® X100 surfactant | 2.721 |
| Sodium Polynapthalene Sulfonate | 0.079 |
| Oleic Acid | 1.043 |
| Deionized water | 40.238 |
| Diethylene glycol monobutyl ether | 2.062 |
| Triethanolamine | 3.955 |
| Hydrocarbon Solvent | 2.526 |
| Acrylic (solids in aqueous disp) (terpolymer parts by weight 39 methyl acrylate/57 ethyl acrylate/ 4 methacrylic acid) | 4.106 |
| alpha aluminum oxide AKP-20 (% solids in dispersion, Table 2) | 6.854 |
| Total | 100 |

TABLE 8

Clear Topcoat formulation for all Examples

| Ingredient | Weight % |
|---|---|
| Titania coated mica, EM Ind | 0.371 |
| Cerium octoate | 0.583 |
| PTFE (solids in aqueous disp) | 39.677 |
| PFA (solids in aqueous disp | 2.089 |
| Triton ® X100 surfactant | 3.110 |
| Oleic Acid | 1.224 |
| Deionized water | 37.804 |
| Diethylene glycol monobutyl ether | 2.419 |
| Triethanolamine | 4.591 |
| Hydrocarbon Solvent | 2.962 |
| Acrylic (solids in aqueous disp) (terpolymer parts by weight 39 methyl acrylate/57 ethyl acrylate/ 4 methacrylic acid) | 4.106 5.170 |
| Total | 100 |

Examples 3, 4, 5

Examples 3, 4, and 5 are examples of a three layer coating system using one undercoat which is a primer made according to the present invention and two overcoats, an intermediate coating and topcoat. Three separate smooth aluminum 3004 substrates which have been thoroughly cleaned but not grit blasted or subjected to other chemical treatment are partially coated with a black ceramic-based enamel coating to a surface area coverage between 40–50% to be representative of enamel over-spray encountered in the manufacture of decorative cookware. Primer layers for Example 3,4, and 5 having the formulas as listed in Table 9 are respectively sprayed on the three substrates. The primers are applied at film builds in the range 0.25–0.4 mil (6.4–10 micrometers) and dried at 150° F. (66° C.) for 5 minutes.

Subsequently intermediate coatings having the formulas as listed in Table 10 are applied for each substrate of Examples 3,4, and 5. A top coat having the formula listed in Table 8 is applied to all three substrates. The intermediate coating and topcoat are applied at film builds in the range 0.5–0.8 mil (13–20 micrometers) and 0.3–0.5 mil (8–13 micrometers) respectively followed by drying at 300° F. (149° C.) for 5 minutes and then baking at 800° F. (427° C.) for 4–5 minutes.

The coated substrates are subjected to the cross hatch adhesion test as described above with the exception that boiling water submersion is 20 minutes. Results are listed in Table 11. Adhesion is excellent with none or one square of coating being removed by the tape.

Comparison Examples 2,3

For comparison to the present invention, two aluminum substrates having a three coating system (primer, intermediate coating and topcoat) are prepared with the primer layers have substantially less inorganic filler than the invention and a greater fluoropolymer content. The substrates are prepared as described in Examples 3, 4, and 5 including having the 40–50% enamel over-spray. The compositions of the primer layers are listed in Table 9. The compositions of the intermediate coatings are listed in Table 10. The top coat composition as listed in Table 8 is the same for both substrates. The application of the coatings and processing conditions are the same as described in Examples 3,4, and 5.

The coated substrates are subjected to the cross hatch adhesion test as described above with the exception that boiling water submersion is 20 minutes. Results are listed in Table 11 and it is evident that the coatings applied in the Comparison Examples 2 and 3 perform poorly as evidenced by the number of squares of coating removed by the tape.

TABLE 9

Primer formulations for Examples 3–5 and Comp. Examples 2, 3

| Primers Ingredient | Comp. Ex. 2 | Comp. Exp. 3 | Ex. 3 | Ex. 4 | Ex. 5 |
|---|---|---|---|---|---|
| | | | Weight % | | |
| Black pigment | 1.423 | 0.305 | | | |
| Ultramarine blue pigment | 3.204 | 1.770 | | | |
| Zinc oxide | 0.004 | 0.002 | | | |
| Zinc Phosphate | | 0.108 | | | |
| Polyamic acid | 4.99 | 4.719 | 5.502 | 5.382 | 5.323 |
| PTFE(solids in aq. disp.) | 4.417 | 4.211 | | 1.315 | 1.301 |
| FEP (solids in aq. disp.) | 2.916 | 2.863 | | | |
| Ludox ® colloidal silca | 0.314 | 0.951 | | | |
| Deionized water | 69.337 | 66.368 | 62.431 | 61.86 | 67.532 |
| Triethanolamine | 0.14 | 0.214 | | | |
| Triton ® X100 surfactant | 0.659 | 0.578 | 0.187 | 0.262 | 0.552 |
| Surfynol ® 400 | | 0.244 | | | 0.185 |
| Sodium Polynapthalene Sulfonate | 0.106 | 0.023 | | | |
| Diethyl alcohol amine | 0.696 | 0.659 | 0.768 | 0.751 | 0.743 |
| Triethyl amine | 1.393 | 1.317 | 1.536 | 1.502 | 1.485 |
| 2-amino-2-methyl-1-propanol | | 0.947 | | | |
| Furfuryl Alcohol | 3.842 | 3.595 | 4.240 | 4.147 | 3.634 |
| N-methylpyrrolidone | 3.235 | 3.060 | 3.567 | 3.489 | 3.451 |
| Calcined aluminum oxide Alcoa Grade A16 SG, made by Alcoa Industrial Chemical Division, Median Particle size 0.48 microns; aspect ratio <2.5 | | | 21.769 | 21.292 | 15.794 |
| Ceralox HPA-0.5 aluminum oxide, alpha, 99.98% calcined aluminum oxide, made by Condea Vista CO., Median Particle size 0.5 microns; aspect ratio <2.5 | 3.324 | 8.066 | | | |
| Al$_2$O$_3$/PAI ratio | 0.67 | 1.71 | 3.96 | 3.96 | 2.97 |
| % Fluoropolymer of Solids | 35.61 | 30.76 | 0.00 | 4.70 | 5.80 |

TABLE 10

Intermediate coating formulations for Examples 3–5 and Comparative Examples 2, 3

| Intermediate Coatings Ingredient | Comp. Ex. 2 | Comp. Exp. 3 | Ex. 3 | Ex. 4 | Ex. 5 |
|---|---|---|---|---|---|
| | | | Weight % | | |
| Black pigment | 1.032 | 1.172 | 0.833 | 0.797 | 0.764 |
| Ultramarine blue pigment | 0.275 | 0.255 | 0.222 | 0.212 | 0.203 |
| Titania coated mica, EM Ind | 0.724 | 0.217 | 0.584 | 0.559 | 0.537 |
| PTFE (solids in aqueous dis) | 28.003 | 39.75 | 22.594 | 21.628 | 20.743 |
| PFA (solids in aqueous disp) | 4.945 | | 3.989 | 3.819 | 3.662 |
| Polyamic acid | | | 1.360 | 1.739 | 1.667 |
| Cerium octoate | 0.484 | 0.591 | 0.391 | 0.374 | 0.359 |
| Triton ® X100 surfactant | 2.651 | 3.124 | 2.159 | 2.067 | 1.982 |
| Sodium Polynapthalene Sulfonate | 0.077 | 0.05 | 0.062 | 0.059 | 0.057 |
| Oleic Acid | 1.017 | 1.241 | 0.820 | 0.785 | 0.753 |
| Deionized water | 41.62 | 38.593 | 49.160 | 50.231 | 52.281 |

TABLE 10-continued

Intermediate coating formulations for Examples 3–5 and Comparative Examples 2, 3

| Intermediate Coatings Ingredient | Comp. Ex. 2 | Comp. Exp. 3 | Ex. 3 | Ex. 4 | Ex. 5 |
|---|---|---|---|---|---|
| | | | Weight % | | |
| Diethylene glycol monobutyl | 2.01 | 2.453 | 1.621 | 1.552 | 1.488 |
| Triethanolamine | 4.021 | 4.681 | 3.110 | 2.977 | 2.855 |
| Triethyl amine | | | 0.380 | 0.485 | 0.465 |
| Diethyl alcohol amine | | | 0.190 | 0.243 | 0.233 |
| 2-amino-2-methyl-1-propanol Hydrocarbon Solvent | 2.46 | 3.003 | 1.986 | 1.9 | 1.821 |
| Furfuryl Alcohol | | | 1.048 | 1.187 | 1.138 |
| N-methylpyrrolidone | | | 0.882 | 1.127 | 1.081 |
| Acrylic (solids in aqueous dispersion), terpolymer of 39 parts by weight methyl acrylate/57 parts ethyl acrylate/4 parts methacrylic acid. | 4.002 | 4.87 | 3.228 | 3.100 | 2.964 |
| Calcined aluminum oxide Alcoa Grade A16 SG, made by Alcoa Industrial Chemical Division, Median Particle size 0.48 microns; aspect ratio <2.5 | | | 5.381 | 5.159 | 4.947 |
| Ceralox HPA-0.5 aluminum oxide, alpha, 99.98% calcined aluminum oxide, made by Condea Vista CO., Median Particle size 0.5 microns; aspect ratio <2.5 | 6.679 | | | | |

TABLE 11

Cross Hatch Test Results for Examples 3–5 and Comparative Examples 2, 3

| Total film build (micrometers) | Comp. Ex. 2 1.40 | Comp Ex. 3 1.45 | Ex. 3 1.44 | Ex. 4 1.49 | Ex. 5 1.42 |
|---|---|---|---|---|---|
| Test 1 | 2/100 | 98/100 | 0/100 | 0/100 | 0/100 |
| Test 2 | 18/100 | 2/100 | 0/100 | 0/100 | 0/100 |
| Test 3 | 5/100 | 27/100 | 0/100 | 0/100 | 0/100 |
| Test 4 | | 1/100 | | | |

The non-stick coating system of the present invention characterized by having an undercoat containing high levels of inorganic filler of ceramic particles, adhesion promoter and from 0 to 25 wt. % fluoropolymer exhibits reduced shrinkage during the drying and curing processes normally associated with the application of fluoropolymer systems. The coating system has superior adhesion and wear, scratch and abrasion resistance and is especially useful in application to decorative cookware where a ceramic coating covers at least a portion of the interior of the cookware.

What is claimed is:

1. A substrate coated with a non-stick coating, said coating comprising an undercoat and a fluoropolymer overcoat, said undercoat containing (a) inorganic filler of ceramic particles, the particles having a particle size of 1 micrometer or less and an aspect ratio of not greater than 2.5, (b) at least one adhesion promoter wherein the weight proportion of inorganic filler to adhesion promoter is in the range of 5:1 to 1.7:1, and (c) from 0 to 25 wt. % of a fluoropolymer based on the weight of the composition of the undercoat layer after baking.

2. The coated substrate of claim 1 wherein said undercoat contains from 1 to 15 wt. % of a fluoropolymer based on the weight of the composition of the undercoat after baking.

3. The coated substrate of claim 1 in the undercoat is a base coat on said substrate.

4. The coated substrate of claim 1 wherein the undercoat is a primer on said substrate.

5. The coated substrate of claim 1 wherein the undercoat is a primer applied to a base coat.

6. The coated substrate of claim 1 wherein said substrate prior to coating is smooth.

7. The coated substrate of claim 1 which is a metal substrate.

8. The coated substrate of claim 1 wherein at least a portion of the metal substrate is coated with a ceramic coating.

9. The coated substrate of claim 1 wherein said overcoat comprises an intermediate coating and a topcoat.

10. The coated substrate of claim 1 wherein said overcoat comprises a fluoropolymer which is a non-melt fabricable fluoropolymer with a melt viscosity Up the range from $1 \times 10^7$ to $1 \times 10^{11}$ Pa·s.

11. The coated substrate of claim 1 wherein said overcoat comprises a fluoropolymer which is a blend of a non-melt fabricable fluoropolymer with a melt viscosity in the range from $1 \times 10^7$ to $1 \times 10^{11}$ Pa·s and melt-fabricable fluoropolymer with a melt viscosity in the range from $1 \times 10^3$ to $1 \times 10^5$ Pa·s.

12. The coated substrate of claim 1 wherein said overcoat contains in addition inorganic filler of ceramic particles, the particle having an average particle size of 1 micrometer or less.

13. The coated substrate of claim 12 wherein said overcoat contains in addition organic adhesion promoter.

14. The coated substrate of claim 13 wherein said adhesion promoter is at least one of polyamide imide, polyimide, polyarylene sulfide and polyethersulfone resins.

* * * * *